(12) United States Patent
Novotny et al.

(10) Patent No.: US 11,529,782 B2
(45) Date of Patent: Dec. 20, 2022

(54) RIB- OR FIN-SHAPED ELEMENT, PROFILE RING SEGMENT AND METHOD FOR PRODUCING A PROFILE RING SEGMENT

(71) Applicant: Continental Reifen Deutschland GmbH, Hannover (DE)

(72) Inventors: Michal Novotny, Tlumacov (CZ); Zdenek Cernocky, Zlin (CZ); Evzen Stetkar, Zlin (CZ); Pavel Brazdil, Zlin (CZ); Fabian Bloemer, Hannover (DE)

(73) Assignee: Continental Reifen Deutschland GmbH, Hannover (DE)

(*) Notice: Subject to any disclaimer, the term of this patent is extended or adjusted under 35 U.S.C. 154(b) by 184 days.

(21) Appl. No.: 16/981,007

(22) PCT Filed: Jan. 10, 2019

(86) PCT No.: PCT/EP2019/050513
§ 371 (c)(1),
(2) Date: Sep. 15, 2020

(87) PCT Pub. No.: WO2019/174793
PCT Pub. Date: Sep. 19, 2019

(65) Prior Publication Data
US 2021/0016530 A1    Jan. 21, 2021

(30) Foreign Application Priority Data
Mar. 16, 2018    (DE) .................. 10 2018 204 024.9

(51) Int. Cl.
*B29D 30/06*    (2006.01)
*B33Y 10/00*    (2015.01)
(Continued)

(52) U.S. Cl.
CPC ........ *B29D 30/0606* (2013.01); *B23K 26/342* (2015.10); *B29C 33/3842* (2013.01);
(Continued)

(58) Field of Classification Search
CPC ............ B29C 33/3842; B29D 30/0606; B29D 2030/0613
See application file for complete search history.

(56) References Cited

U.S. PATENT DOCUMENTS

2011/0168311 A1    7/2011    Voss et al.
2011/0309230 A1    12/2011   Lauwers et al.
(Continued)

FOREIGN PATENT DOCUMENTS

DE    102015202328 A1    8/2016
EP       2463121 A1    6/2012
(Continued)

OTHER PUBLICATIONS

International Search Report of International application PCT/EP2019/050513.
(Continued)

*Primary Examiner* — James Sanders
(74) *Attorney, Agent, or Firm* — Gregory Adams; David L. Cate

(57) ABSTRACT

Rib- or fin-shaped element (1, 10) comprising an anchoring part (1 $b_1$, 10$b_1$) and a molding part (1$b_2$, 10$b_2$), wherein the anchoring part (1 $b_1$, 10$b_1$) can be anchored in a profile ring segment of a profile ring of a vulcanizing mold that molds the tread of a vehicle tire and the molding part (1 $b_2$, 10$b_2$) is provided for molding a sipe or a groove in the tread. The element (1, 10) has at least one elongate projection (1a, 11), which forms a bevel at the periphery of the tread and is produced by means of selective laser melting.

9 Claims, 4 Drawing Sheets

(51) Int. Cl.
*B33Y 80/00* (2015.01)
*B23K 26/342* (2014.01)
*B29C 33/38* (2006.01)

(52) U.S. Cl.
CPC ............... *B33Y 10/00* (2014.12); *B33Y 80/00* (2014.12); *B29D 2030/0613* (2013.01)

(56) References Cited

U.S. PATENT DOCUMENTS

| | | |
|---|---|---|
| 2013/0164401 A1 | 6/2013 | Dusseaux |
| 2016/0016371 A1 | 1/2016 | Sasaki |
| 2017/0203365 A1 | 7/2017 | Pays et al. |
| 2018/0281328 A1 | 10/2018 | Collett et al. |

FOREIGN PATENT DOCUMENTS

| | | |
|---|---|---|
| EP | 2960031 A1 | 12/2015 |
| EP | 2987630 A1 | 2/2016 |
| FR | 2940166 A1 | 6/2010 |
| FR | 3024060 A1 | 1/2016 |
| FR | 3053919 A1 | 1/2018 |
| JP | 20000102925 A | 4/2000 |
| WO | 2011161248 A1 | 12/2011 |
| WO | 2016128087 A1 | 8/2016 |
| WO | 2017058226 A1 | 4/2017 |
| WO | 2018015630 A1 | 1/2018 |

OTHER PUBLICATIONS

Chinese Office Action dated Jan. 17, 2022 of application 201980019376.8 which is counterpart of this application.

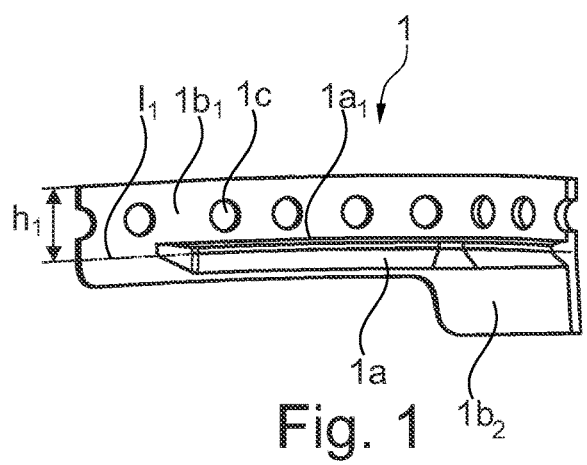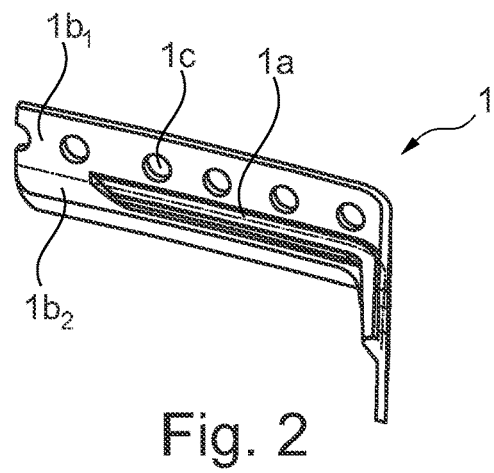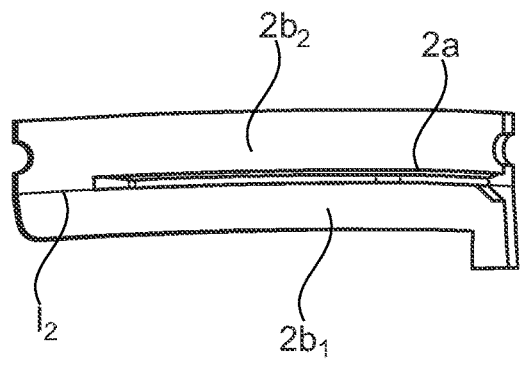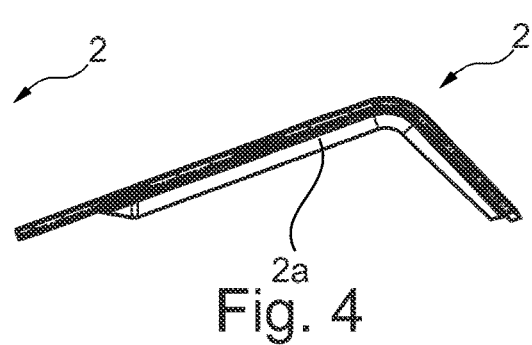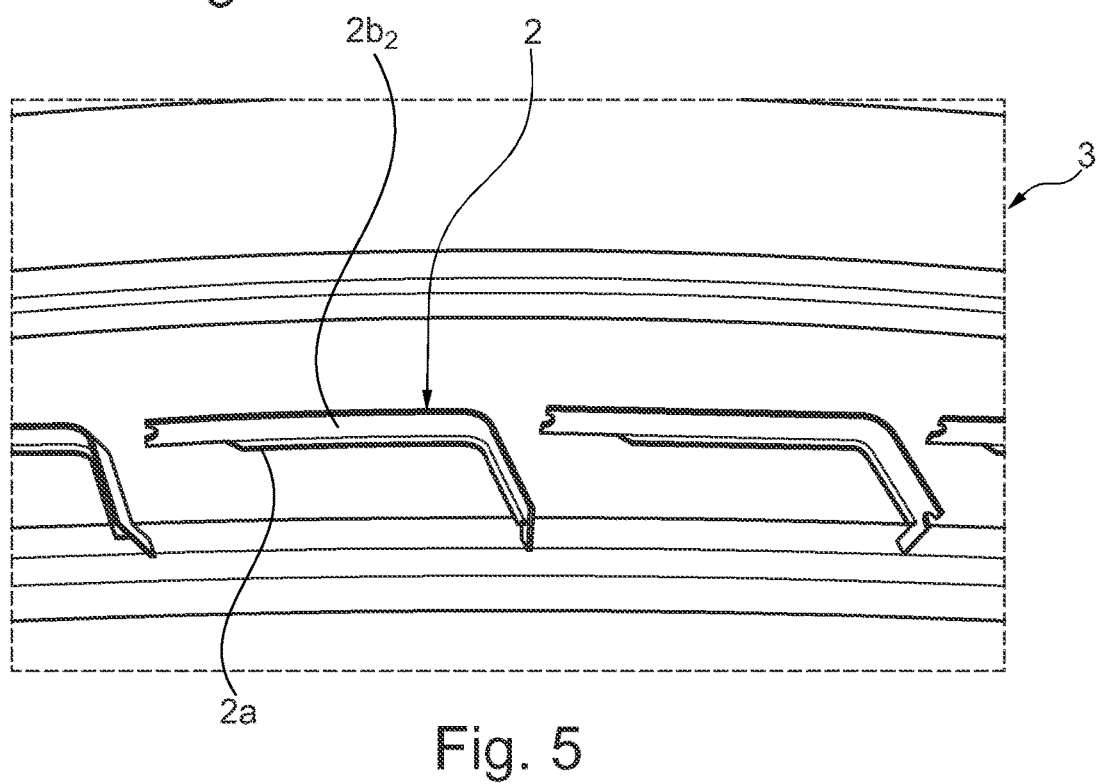

RIB- OR FIN-SHAPED ELEMENT, PROFILE RING SEGMENT AND METHOD FOR PRODUCING A PROFILE RING SEGMENT

The invention relates to a rib- or fin-shaped element comprising an anchoring part and a molding part, wherein the anchoring part can be anchored in a profile ring segment of a profile ring of a vulcanizing mold that molds the tread of a vehicle tire and the molding part is provided for molding a sipe or a groove in the tread. The invention also relates to a profile ring segment of a profile ring of a vulcanizing mold that molds the tread of a vehicle tire, for a vehicle tire, and to a process for producing a profile ring segment of a profile ring of a vulcanizing mold that molds the tread of a vehicle tire, for a vehicle tire with a tread which has sipes and/or grooves, which are provided with at least one bevel running at at least one of their edges with respect to the periphery of the tread.

The vulcanizing of vehicle tires is performed in heating presses, fitted in which there is in each case a vulcanizing mold, which has inter alia a profile ring consisting of multiple segments, which molds the tread of the tire with its profiling. The profile ring segments contain corresponding negative elements, such as fins, ribs and the like, for molding the profiling of the tread with sipes, circumferential grooves, transverse grooves and the like.

It has already been proposed to produce profile ring segments, parts of profile ring segments and fins for molding sipes and by SLM (selective laser melting). In selective laser melting, metal in powder form is applied in a thin layer to a base plate and is completely melted locally by means of laser radiation and, after solidifying, forms a layer of solid material. The base plate is lowered by a layer thickness and powder is once again applied, this operation being repeated until the component has been built up completely. The laser beam is controlled by 3D CAD by means of corresponding software. It is particularly advantageous that the components produced by selective laser melting have a high specific density, so that the mechanical properties of the component produced largely correspond to those of the material used in the construction. In addition, components can be produced very exactly by selective laser melting.

It is known from DE 10 2015 202 328 A1 to produce fins which are anchored in a profile ring segment of a vulcanizing mold by selective laser melting from a metal powder. In this case, the fin may also have fin parts that intersect with other fin parts. This fin has in particular a thickness of 0.5 mm to 1.5 mm and can also be produced with a varying thickness. It is known from EP 2 987 630 A1 to produce the inner mold surface from profile ring segments together with the negative profile elements by selective laser melting. In this case, the entire profile ring segment may be produced by selective laser melting or the part of the profile ring segments on the inside of the mold surface may be produced by this process, preferably with a thickness of up to 20 mm measured in the radial direction. A similar process, in which the segment part containing the negative profiling or the negative profile elements is produced by selective laser melting and is subsequently connected to a cast base segment part, is known from EP 2 960 031 A1.

It is usual to form in treads of pneumatic vehicle tires sipes with a width of in particular 0.4 mm to 0.8 mm, which are beveled along one of their edge regions with respect to the tread periphery and are therefore provided with a bevel. As is known, a bevel is an oblique surface that is elongate in plan view of the tread and runs locally along an edge of a sipe or a groove, possibly also only over a portion of the edge. Bevels are increasingly also being formed on edge regions of narrow transverse grooves with a width of 1.0 mm to 3.0 mm. Such transverse grooves may also be designed in such a way that their width decreases continuously over their course. Bevels at the edges of sipes and transverse grooves have the advantage of preventing the edges from "rolling in" undesirably, help to achieve good water expulsion, especially in the case of new tires, and contribute to stabilizing the profile positives, for example the profile ribs or the profile blocks and the like.

So far, the bevels provided at the edges of sipes and edges of transverse grooves have already been milled out on the milling model of the profile ring segments during the production of the profile ring segments. In the usual process for producing profile ring segments for vulcanizing molds, model fins and/or model ribs are inserted into the milling model and then a flexible plastic casting, a flexible, is created. The fins and/or the ribs are accordingly inserted into the slits formed by the model fins and model ribs in the plastic casting and a plaster core is then produced. A profile ring of an aluminum alloy, in which the fins and ribs are anchored, is cast from plaster core segments assembled into a ring. The profile ring is cut into profile ring segments, processed accordingly and the segments are finally positioned in a vulcanizing mold. In the production of the profile ring segments for the vulcanizing mold, the production of "intermediate segments" and the production of "impressions" of segments are therefore performed several times in intermediate steps. An exact formation of the bevel-forming projections on the profile ring segments suffers as a result. This makes the exact production of very narrow bevel run-outs difficult and a high amount of post-processing is required in individual stages of the process.

The invention is therefore based on the object of being able to produce bevels on sipes and transverse grooves, in particular also narrow bevel run-outs, exactly and without post-processing.

The object addressed is achieved by a rib- or fin-shaped element which has at least one elongate projection, which forms a bevel at the periphery of the tread and is produced by means of selective laser melting.

Rib- or fin-shaped elements with bevel-forming projections can be produced in a particularly exact manner by means of selective laser melting.

In a preferred embodiment, the element is a fin, which has outside the bevel-forming projection a particularly constant thickness of 0.3 mm to 1.5 mm, preferably up to 0.9 mm. Such fins that form sipes in the tread can be produced in a particularly exact manner by means of selective laser melting.

In a further preferred embodiment, the element is a rib, which has outside the bevel-forming projection in the anchoring part a thickness of 0.3 mm to 1.5 mm, in particular of 0.5 mm to 0.8 mm and in the molding part a thickness of 1.0 mm to 3.0 mm.

An embodiment of the elements in which the bevel-forming projection is formed with a 0.1 mm to 1.0 mm thin, strip-shaped portion in the anchoring part and otherwise in the molding part is particularly advantageous. This strip-shaped portion therefore belongs to the anchoring part, as that part which is located in the profile ring segment and therefore within the inside of the mold. This measure ensures a particularly exact formation of bevels on sipes and grooves.

The object addressed is also achieved by a profile ring segment, anchored on the inside of which, for forming sipes and/or grooves with bevels, are fins and/or ribs which are provided with bevel-forming projections and are produced by means of selective laser melting.

Profile ring segments, which contain such fins and/or ribs produced by means of selective laser melting, ensure in the tread of the tire to be vulcanized a very exact formation of bevels at edge regions of sipes and/or grooves, in particular at transverse grooves, preferably also of such bevels that run out along the edges. This makes it possible to produce very high-quality tires, the properties of which imparted by the bevels correspond to those expected and desired.

Particularly preferred is an embodiment of the profile ring segment with fins and/or ribs in which the bevel-forming projection is in each case formed with a 0.1 mm to 1.0 mm thin, strip-shaped portion in the anchoring part and otherwise in the molding part. As a result of this design, the bevel-forming projections on the fins and/or ribs are embedded a little in the profile ring segment, as a result of which the bevels are formed particularly exactly in the tread; in particular, very narrow or else tapering bevel run-outs can be formed particularly exactly.

Profile ring segments, which ensure a particularly exact formation of bevels, can be produced according to the invention as follows:
production of fins and/or ribs with bevel-forming projections by means of selective laser melting,
production of associated model fins and/or model ribs with projections with an outer contour, viewed in plan view of a longitudinal edge of the model fins and/or model ribs, which is adapted to the corresponding outer contour of the projections of the fins and/or ribs,
creation of a milling model with slits for inserting the model fins and/or the model ribs,
creation of a flexible with slits and depressions formed next to the slits by the projections,
insertion of the fins and/or ribs with partial embedding of the bevel-forming projections into the depressions,
completion of the profile ring segment with usual process steps.

Alternatively, profile ring segments, which ensure a particularly exact formation of bevels, can be produced according to the invention as follows:
production of fins and/or ribs with bevel-forming projections by means of selective laser melting,
production of associated model fins and model ribs with constant thickness and smooth side surfaces,
creation of a milling model with slits for inserting the model fins and/or model ribs and with 0.1 mm to 1.0 mm low elevations next to the slits with an outer contour that is adapted to the outer contour of the projections on the fins and/or ribs,
creation of a flexible with slits and with depressions formed next to the slits by the elevations,
insertion of the fins and/or ribs with partial embedding of the bevel-forming projections into the depressions,
completion of the profile ring segment with usual process steps.

In the case of model fins which are provided with projections when they are produced, the projections are formed as 0.1 mm to 1.0 mm thin webs, the milling model being created in such a way that the webs of the model fins in their inserted position lie on the outer surface of the milling model.

In the case of the model ribs, the projections are preferably formed as bevel-forming projections.

The model fins and/or model ribs provided with projections or webs are preferably produced by means of selective laser melting. Those model fins and/or model ribs that do not have such webs or projections are also preferably produced by means of selective laser melting.

The invention also relates to a vehicle tire, in particular a pneumatic vehicle tire which has been vulcanized in a vulcanizing mold that contains profile ring segments produced by one of the processes according to the invention.

Further features, advantages and details of the invention will now be described in more detail on the basis of the schematic drawing, which schematically illustrates exemplary embodiments. In the drawing:

FIG. 1 and FIG. 2 show views of a fin according to the invention,

FIG. 3 and FIG. 4 show views of an associated model fin,

Figure 6:
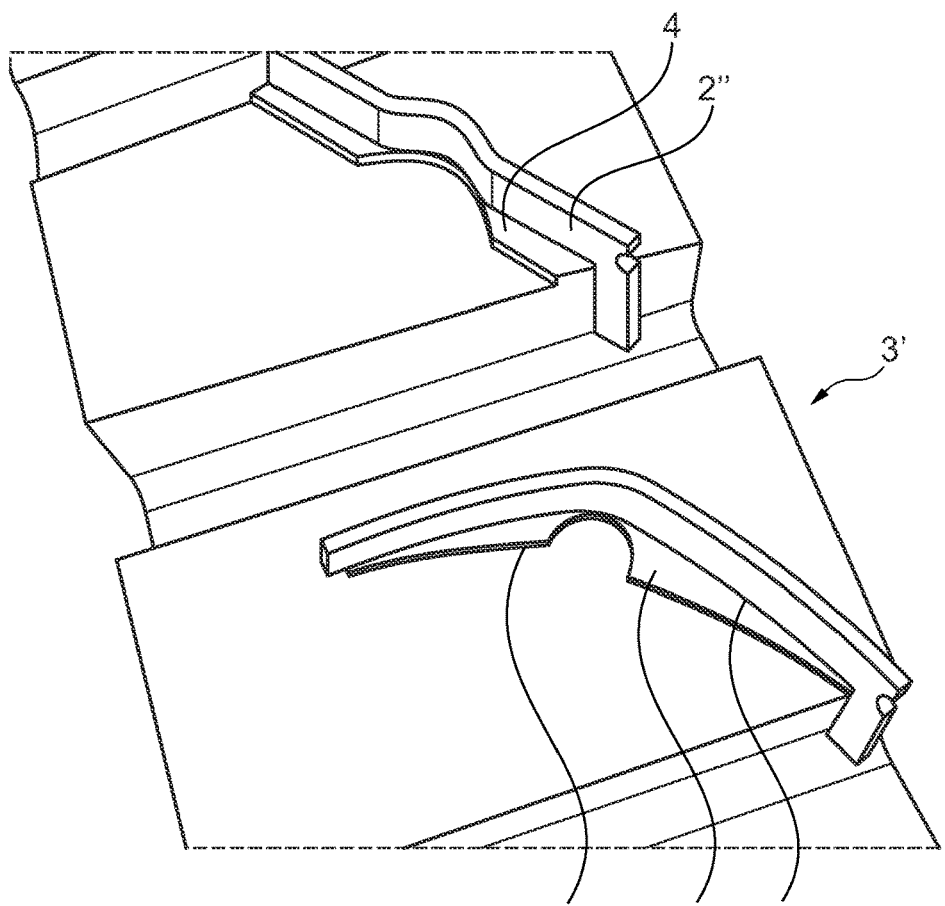
Figure 7:
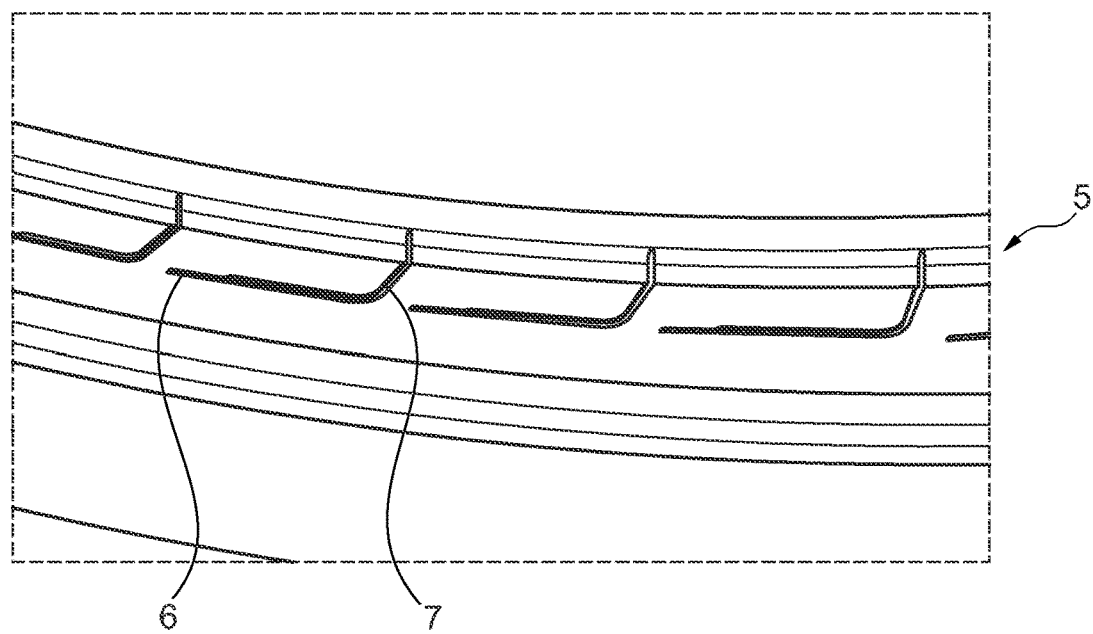
Figure 8:
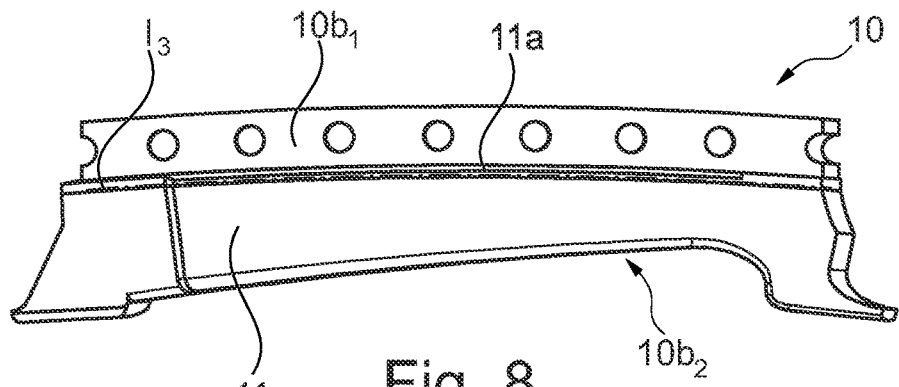
Figure 9:
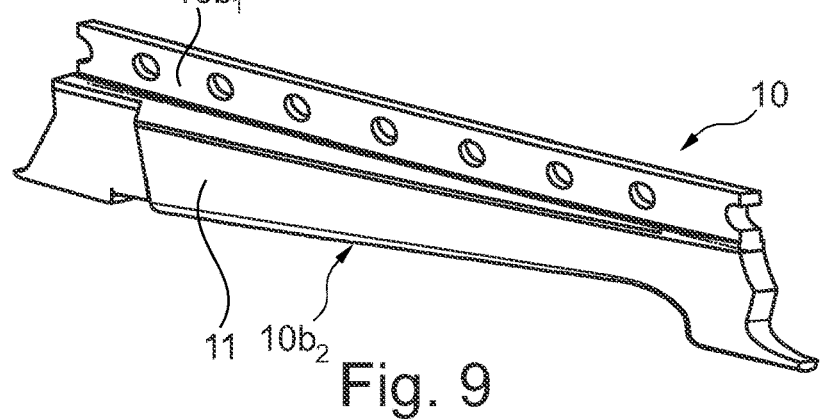
Figure 10:
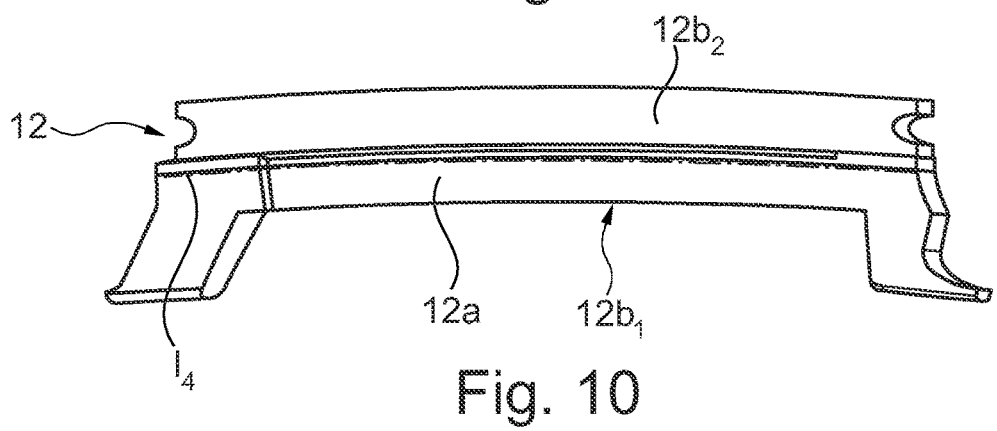
Figure 11:
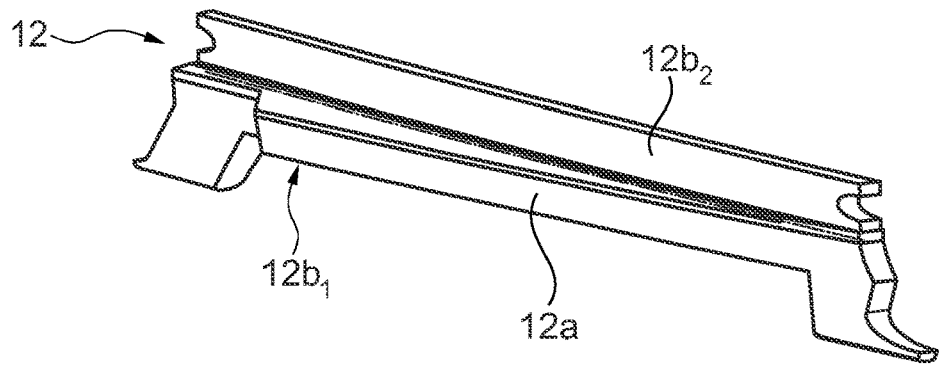
Figure 12:
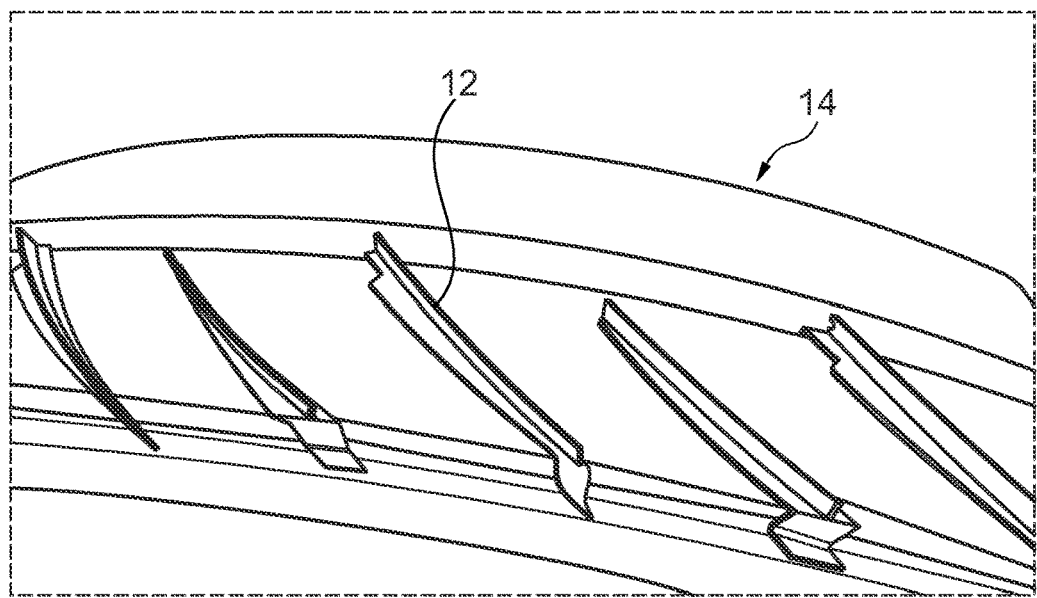
Figure 13:
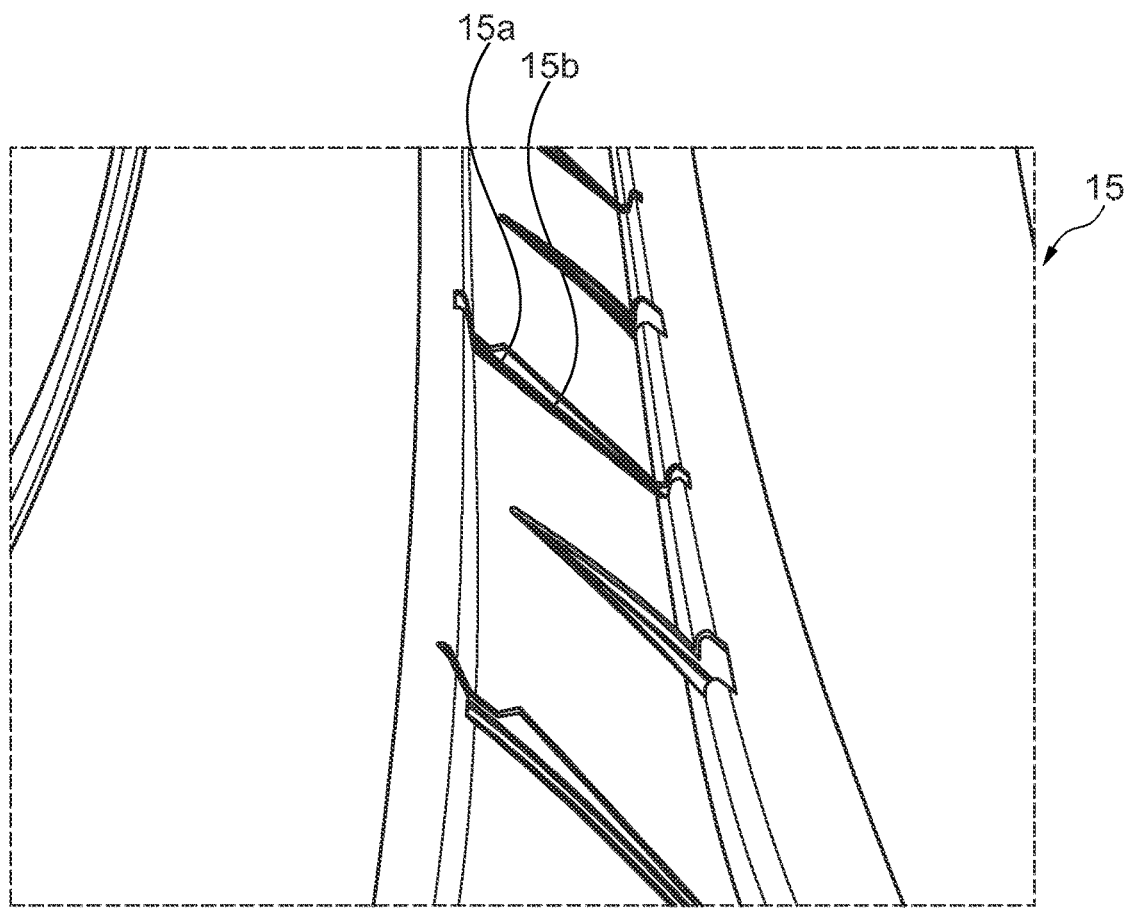

FIG. 5 shows a view of a detail of a milling model segment with inserted model fins, FIG. 6 shows a detail of a variant of a milling model segment, FIG. 7 shows a view of a detail of a flexible before the insertion of fins, FIG. 8 and FIG. 9 show views of a rib, FIG. 10 and FIG. 11 show views of an associated model rib, FIG. 12 shows a view of a detail of the milling model segment with inserted model ribs, FIG. 13 shows a view of a detail of a flexible.

The invention is concerned with specially designed fin- or rib-shaped elements for molding sipes and/or narrow grooves, in particular transverse grooves, having beveled edge regions, in a tread of a pneumatic vehicle tire while it is being vulcanized in a vulcanizing mold. The invention is also concerned with the design and production of profile ring segments of a profile ring of a vulcanizing mold for pneumatic vehicle tires.

Pneumatic vehicle tires are to be understood as meaning radial-type tires, in particular tires for passenger cars, vans, light trucks, trucks or buses. A bevel is known to be a slanted narrow surface formed locally or in a specific place and running along an edge of a groove or an edge of a sipe. Both in the case of narrow grooves and in the case of sipes, the bevels may only run over a portion of an edge. A sipe has—apart from that region where a bevel is formed—a particularly constant thickness of 0.3 mm to 1.5 mm, preferably up to 0.9 mm; a narrow groove has—likewise apart from that region where a bevel is formed—a width of 1.0 mm to 3.0 mm, wherein the width can vary over the longitudinal extent of the groove, for example can become continuously smaller. A transverse groove is a groove that extends over a large part of its extent at an angle greater than 45° to the circumferential direction of the tread.

According to the invention, the sipes provided with beveled edges or edge regions and/or narrow grooves, in particular transverse grooves, are formed in the rubber material of the tread by fins and ribs, which are produced from metal powder by means of SLM (Selective Laser Melting) during the vulcanizing of the pneumatic vehicle tire in a vulcanizing mold.

Vulcanizing molds for pneumatic vehicle tires usually contain profile rings consisting of a number of profile ring segments, formed on the insides of which are webs for forming wide grooves, for example circumferential grooves, and anchored on the insides of which are the fins for forming the sipes and/or the ribs for forming narrow grooves.

The production of the profile ring segments is performed in a number of steps with the creation or production of a milling model, a flexible, a plaster core and finally the profile ring segment consisting of an aluminum alloy.

The milling model is usually a milled plastic model of a mold segment, created in a program-controlled manner with a CNC milling machine, with sipes corresponding to the course of the grooves and sipes intended for the tread concerned, but without bevels. Model fins and/or model ribs are inserted into the milling model, into the sipes in a way corresponding to the design of the tread, and protrude a few millimeters beyond the outer surface.

The flexible is produced using the milling model from a flexible plastics material by casting. The flexible contains slits as "impressions" of the protruding parts of the model fins and/or model ribs. The fins or the ribs are inserted into the slits, the fins and the ribs protruding a few millimeters beyond the outer surface.

The plaster core is created as an impression of the flexible and contains the parts of the fins and ribs protruding from the previous flexible. Therefore, those parts of the fins and the ribs that were within the flexible in the step before protrude from the outer surface of the plaster core.

A ring is formed from a corresponding number of plaster core segments and a ring of an aluminum alloy is cast over the outside thereof. The segments of the plaster core are destroyed and removed. The ring of the aluminum alloy is cut into segments, which are then processed in a manner known per se and finally inserted as profile segment rings into a vulcanizing mold. The parts of the fins and the ribs projecting from the plaster core segments are then firmly anchored in the profile segment rings; the parts of the fins and ribs projecting from the profile segment rings form sipes and narrow grooves in the tread of the tire to be vulcanized.

In the production of the fins and/or ribs by SLM (Selective Laser Melting), the material, a metal powder, is applied in a thin layer to a base plate, completely melted locally by means of laser radiation and, after solidifying, forms a layer of solid material. The base plate is lowered by a layer thickness and powder is once again applied and melted. The individual layers are generated from 3D data, for example using CAD systems. The model fins and model ribs can also be produced by means of SLM.

FIG. 1 and FIG. 2 show views of an example of a fin 1; FIG. 3 and FIG. 4 show views of an associated model fin 2. The fin 1 has two lamellar portions, which run in an L-shaped manner in relation to one another and together enclose an obtuse inner angle, which in the example is of the order of magnitude of approximately 120°. The outer side surfaces of the portions of the fin 1 that cannot be seen in the figures are smooth surfaces. On the inner surfaces of the portions of the fin 1 enclosing the inner angle, a bevel-forming projection 1a runs over the majority of the two portions, and is thus responsible for forming a corresponding bevel along one edge of a sipe in the tread of the tire.

The bevel-forming projection 1a has a cross section which cannot be seen and is approximately triangular, since it is designed as a positive of the bevel to be formed. The dashed line $l_1$ in FIG. 1 symbolizes the boundary between an anchoring part $1b_1$, with which the fin 1 is anchored in the profile ring segment consisting of the aluminum alloy, and a molding part $1b_2$, with which the fin 1 penetrates into the tread of the green tire. A narrow, approximately 0.1 mm to 1.0 mm wide, strip-shaped portion $1a_1$ of the projection 1a, which extends over the longitudinal extent of the bevel-forming projection 1a, is located in the anchoring part $1b_1$ of the fin 1 or belongs to the anchoring part $1b_1$. In the anchoring part $1b_1$, which has for example a height $h_1$ of 4.0 mm to 5.0 mm, holes 1c are formed in order to firmly anchor the fin 1 in the aluminum alloy. In the example, the molding part $1b_2$ has portions of different widths in order to form a sipe with corresponding portions of different depths.

In a way corresponding to the design of the fin 1, the model fin 2 shown in FIG. 3 and FIG. 4 is provided in plan view with two portions running in an L-shaped manner in relation to one another, over which an anchoring part $2b_1$ and a molding part $2b_2$ runs, the dashed line $l_2$ symbolizing the boundary between the anchoring part $2b_1$ and the molding part $2b_2$. Formed along the line $l_2$ is a 0.1 mm to 1.0 mm thin web 2a, belonging to the molding part $2b_2$, the outer shape of which, viewed in plan view, is designed according to the outer contours, also viewed in plan view, of the portion $1a_1$ of the projection 1a of the fin 1. The fin 1 and the model fin 2 have, apart from those regions where the projection 1a or the web 2a is formed, a thickness which corresponds to the width of the sipe to be produced.

FIG. 5 shows a plan view of a small detail of a milling model 3 with model fins 2 inserted in L-shaped slits. The anchoring part $2b_1$ of the model fins 2 is located in the L-shaped slits of the milling model 3; the molding part $2b_2$ with the web 2a protrudes above the surface of the milling model 3, the web 2a lying on the surface. The milling model 3 also contains further structures that are either not shown or are not described further, for example wide grooves.

FIG. 6 shows a detail of a milling model 3' with alternative designs in which model fins 2', 2" that do not have a web are used. Instead of the web, elevations 4 with a height of 0.1 mm to 1.0 mm and a corresponding outer contour are milled in the milling model 3' along the corresponding edges of the slits provided for receiving the model fins 2', 2".

FIG. 7 shows a plan view of a detail of a flexible 5 corresponding to FIG. 5. What can be seen are the slit 6 formed by the molding part $2b_2$ of the model fin 2 or 2' and the shallow depression 7 in the flexible 5 formed by the web 2a or by projections 4.

In the next step, a fin 1 is inserted with its anchoring part $1b_2$ into each slit 6 and, when all of the fins 1 have been inserted, the plaster core, not shown, is produced. In the plaster core, the molding part $1b_2$ is located within the material of the plaster core; the anchoring part $1b_1$ protrudes. In the profile ring segments subsequently produced, as already described, the molding parts $1b_2$ therefore protrude from the insides of the segments; the anchoring parts $1b_1$ are located within the segments.

FIG. 8 and FIG. 9 show views of a rib 10, for example for forming a narrow transverse groove in the tread of the pneumatic vehicle tire. The rib 10 has an anchoring part $10b_1$ and a molding part $10b_2$, one side surface of which, which cannot be seen, is smooth in the example and the second side surface of which is provided with a bevel-forming projection 11. The thickness of the molding part $1b_2$ outside the projection 11 is 1.0 mm to 3.0 mm. The dashed line $l_3$ marks the boundary between the parts $10b_1$ and $10b_2$. A 0.1 mm to 1.0 mm thin strip-shaped portion 11a of the projection 11 is located outside the line $l_3$ in the anchoring part $10b_1$ and belongs to the anchoring part $10b_1$. Apart from the portion 11a, the thickness of the anchoring part $10b_1$ is mostly less than the thickness of the molding part $10b_2$ and is, for example, of the order of magnitude of 0.5 mm, in particular 0.3 mm to 1.5 mm, preferably 0.5 mm to 0.8 mm. The projection 11, which in the example tapers out toward one end of the rib 10, provides for the formation of a bevel on the molding part $10b_2$ along one edge of the transverse groove.

FIG. 10 and FIG. 11 show an associated model rib 12 with an anchoring part $12b_1$ and a molding part $12b_2$, in each case on one side of a dashed line $l_4$. Formed on one side surface of the model rib 12 is a bevel-forming projection 12a, which corresponds to a part of the projection 11, to be specific the upper part of the projection 11 in FIG. 8, on the rib 12. The projection 12a extends beyond the line $l_4$ with a strip-shaped portion having a thickness of 0.1 mm to 1.0 mm. The anchoring part 12b$_2$ has a thickness which corresponds in particular to that of the anchoring part 10b$_1$ of the rib 10. The molding part 12b$_1$ is adapted in its dimensions to the molding part 10b$_2$ of the rib 10.

FIG. 12 shows a detail of the milling model 14 at the point where a model rib 12 is inserted with its anchoring part 12b$_1$ in a correspondingly shaped slit. With the model rib 12 inserted, the projection 12a is located within the slit of the milling model 14, apart from a protrusion of approximately 0.1 mm to 0.2 mm.

By analogy with FIG. 6, it can alternatively be envisaged to use model ribs without projections and to form correspondingly flat elevations in the milling model.

Once all of the model ribs 12 have been inserted, the flexible 15 is produced from a plastic compound. FIG. 13 shows a plan view of a detail of the produced flexible 15 in that region where the molding parts 12b$_2$ of two model ribs 12 have corresponding depressions 15a and slits 15b. Alternatively, the depressions 15a may have been formed by flat projections on the milling model.

By analogy with the first exemplary embodiment, in the next step the ribs 10 are correspondingly inserted in the flexible 15 and, by analogy with the description already given of the first exemplary embodiment, a plaster core is created, from which the anchoring parts 10b$_1$ protrude. The further steps for producing the profile ring segments from an aluminum alloy largely correspond to those already described.

LIST OF REFERENCE SIGNS

1 . . . Fin
1a . . . Projection
1a$_1$ . . . Portion
1b$_1$ . . . Anchoring part
1b$_2$ . . . Molding part
1c . . . Hole
2, 2', 2" . . . Model fin
2a . . . Web
2b$_1$ . . . Anchoring part
2b$_2$ . . . Molding part
3, 3' Milling model
4 . . . Elevation
5 . . . Flexible
6 . . . Slit
7 . . . Depression
10 . . . Rib
10b$_1$ . . . Anchoring part
10b$_2$ . . . Molding part
11 . . . Projection
11a . . . Portion
12 . . . Model rib
12a . . . Projection
12b$_1$ . . . Anchoring part
12b$_2$ . . . Molding part
14 . . . Milling model
15 . . . Flexible
15a . . . Depression
15b . . . Slit
h$_1$ . . . Height
l$_1$, l$_2$ . . . Line
l$_3$, l$_4$ . . . Line

The invention claimed is:

1. A method for forming a fin for producing a tire tread, the method comprising:
    forming a fin having an anchoring part and a molding part that run in an L-shaped manner and together enclose an obtuse inner angle and have a smooth outer surface;
    forming the anchoring part to have a substantially constant width;
    forming a bevel projection on an inner surface of the anchoring part;
    forming a plurality of holes in the anchoring part;
    forming the molding part to have varied widths and a constant thickness that correspond to grooves of a tire tread;
    forming a milling model to have elevations and slits for receiving the fin;
    inserting the fin into one of the slits of the milling model;
    producing a plaster core after inserting the fin into the slits of the milling model having the molding part within the plaster core and the anchoring part protrudes from the plaster core;
    forming a ring segment from the plaster core that has the molding part protrude from inside the segment and the anchoring part located within the segment; and
    forming a milling model from the ring segment and having the fin.

2. The method of claim 1, the bevel projection is formed as a 0.1 mm to 1.0 mm web on an outer surface of the milling model.

3. The method of claim 1, forming the anchoring part having a height h1 of 4.0 mm to 5.0 mm.

4. The method of claim 1, forming the holes periodically and to firmly anchor the fin in an aluminum alloy.

5. The method of claim 1, forming the L-shape comprising forming a longitudinal portion and a transverse portion.

6. The method of claim 5, the transverse portion is less than half a length of the longitudinal portion.

7. The method of claim 1, inserting a plurality of additional fins into the slits of the milling model.

8. The method of claim 7, forming the tire tread having the grooves that correspond to the varied widths and thicknesses of the molding part.

9. The method of claim 1, forming the fin by laser melting.

\* \* \* \* \*